United States Patent
Chang et al.

(10) Patent No.: US 9,621,785 B2
(45) Date of Patent: Apr. 11, 2017

(54) PASSIVE AUTO-FOCUS DEVICE AND METHOD

(71) Applicant: REALTEK SEMICONDUCTOR CORPORATION, Hsinchu (TW)

(72) Inventors: Wei-Te Chang, Taoyuan County (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 162 days.

(21) Appl. No.: 14/602,871

(22) Filed: Jan. 22, 2015

(65) Prior Publication Data

US 2015/0312469 A1    Oct. 29, 2015

(30) Foreign Application Priority Data

Apr. 24, 2014    (TW) .............................. 103114899 A (51) Int. Cl.
*H04N 5/232* (2006.01)
*G03B 13/00* (2006.01)
*G03B 13/36* (2006.01)

(52) U.S. Cl.
CPC ......... *H04N 5/23212* (2013.01); *G03B 13/36* (2013.01)

(58) Field of Classification Search
CPC .... H04N 5/23212; G02B 7/105; G02B 7/282; G02B 7/28; G02B 7/36; G02B 7/38; G03B 3/00; G03B 13/36

(Continued)

(56) References Cited

U.S. PATENT DOCUMENTS

| 7,751,700 B2* | 7/2010 | Kusaka ................. G03B 13/28 348/345 |
| 2009/0115887 A1* | 5/2009 | Sugimoto .......... H04N 5/23212 348/349 |

(Continued)

FOREIGN PATENT DOCUMENTS

| CN | 101806948 A | 8/2010 |
| CN | 103324004 A | 9/2013 |

OTHER PUBLICATIONS

Office Action dated Jun. 24, 2015 of the counterpart TW application No. 103114899.

(Continued)

*Primary Examiner* — Kelly L Jerabek
(74) *Attorney, Agent, or Firm* — WPAT, P.C., Intellectual Property Attorneys; Anthony King (57) ABSTRACT

A passive auto-focus device and method are disclosed herein. An embodiment of the passive auto-focus device comprises: a focus-searching-range decision circuit operable to compare a range of a variation area of a current scene with a predetermined range and determine a focus-searching range, in which the variation area is defined according to the comparison between the current scene and a preceding scene; a focal-distance-variation decision circuit operable to compare the definition pertaining to the focus-searching range with a first predetermined definition and generate a current step setting value; an image record generating circuit operable to generate first step image records in connection with the focus-searching range while the current step setting value indicates a first step and to generate second step image records in connection with the focus-searching range while the current step setting value indicates a second step, in which the first step is shorter than the second step.

20 Claims, 8 Drawing Sheets

(58) Field of Classification Search
    USPC .................................. 348/345–347, 349–356
    See application file for complete search history.

(56) References Cited

U.S. PATENT DOCUMENTS

| | | | | |
|---|---|---|---|---|
| 2009/0202235 | A1* | 8/2009 | Li | H04N 5/23212 396/125 |
| 2009/0256953 | A1* | 10/2009 | Yasuda | G03B 13/32 348/349 |
| 2010/0182493 | A1* | 7/2010 | Yuba | H04N 5/23212 348/348 |
| 2010/0209093 | A1 | 8/2010 | Uehara | |
| 2013/0113984 | A1* | 5/2013 | Shimamoto | G03B 13/32 348/345 |
| 2016/0205313 | A1* | 7/2016 | Uenishi | G02B 7/36 348/345 |

OTHER PUBLICATIONS

English abstract translation of the Office Action dated Jun. 24, 2015 of the counterpart TW application No. 103114899.
Search report dated Jun. 24, 2015 of the counterpart TW application No. 103114899.
English abstract translation of CN 103324004A.
CN 101806948A is also published as US20100209093.
Fang-Hsuan Cheng et al., "Research on Fast Image Based Auto Focus Technique, Journal of Information Technology and Applications", vol. 3, No. 1, pp. 67-76, 2008.
Abstract translation of "Research on Fast Image Based Auto Focus Technique, Journal of Information Technology and Applications".

* cited by examiner

PASSIVE AUTO-FOCUS DEVICE AND METHOD

BACKGROUND OF THE INVENTION

1. Field of the Invention

The present disclosure relates to an auto-focus device and method, especially to a passive auto-focus device and method.

2. Description of Related Art

The focus technique for a general image capture device includes active auto-focus technique and passive auto-focus technique. The active auto-focus technique is operable to actively send out a signal and receive the response thereof to determine the distance between an image capture device and a to-be-captured object while the passive auto-focus technique is operable to determine the optimal focus for the to-be-captured objet by analyzing the definition of the temporarily captured image of the said object.

Regarding the passive auto-focus technique, hill climbing algorithm is widely adopted in this kind of technique. The hill climbing algorithm, as implied by the name, finds out the peak of a definition variation curve in connection with a focus-searching area in the direction of ascending definition with a focusing mechanism, and takes the position of the focusing mechanism in association with the peak as the position for the optimal focus. The said focus-searching area is usually the central area of a to-be-captured scene, and the range thereof is usually constant. More specifically, if the range of the focus-searching area is too broad, there is a high possibility of including scenes in different depths of field; in this case, the hill climbing algorithm may choose the definition peak in connection with an indifferent scene and lead to an erroneous focus. On the contrary, if the range is overly narrow, there is a high possibility of missing the target scene; in this case, the hill climbing algorithm can only find out the definition peak in connected with an indifferent scene within the narrow range and miss the interested scene outside the range. In practice, a regular focus-searching range could be appropriate for certain scenes, but too broad or too narrow for others. As for other passive auto-focus techniques using different algorithms, they might face the similar problems, the problem of slow focusing speed, or the problem of noise influence.

People who are interested in the prior art may refer to the following document: Fang-Hsuan Cheng, Hsin-Wei Mao, "Research On Fast Image Based Auto Focus Technique", Journal of Information Technology and Applications, Vol. 3, No. 1, pp. 67-76, 2008.

SUMMARY OF THE INVENTION

In consideration of the problems of the prior art, an object of the present disclosure is to provide a passive auto-focus device and method capable of making improvements over the prior art.

The present disclosure discloses a passive auto-focus device operable to adaptively determine a focus-searching range and/or a focus-searching step during a focusing process. An embodiment of the passive auto-focus device includes a focus-searching-range decision circuit, a focal-distance-variation decision circuit and an image record generating circuit. The focus-searching-range decision circuit is operable to compare a range of a variation area of a current scene with a predetermined range so as to determine a focus-searching range, in which the variation area of the current scene is defined according to the comparison between the current scene and a preceding scene. The focal-distance-variation decision circuit is operable to generate a current step setting value according to the focus-searching range or by comparing the definition pertaining to the focus-searching range with a first predetermined definition. The image record generating circuit is operable to generate a plurality of first step image records in connection with the focus-searching range when the current step setting value indicates a first step and to generate a plurality of second step image records in connection with the focus-searching range when the current step setting value indicates a second step, in which the first step is shorter than the second step.

The present disclosure also discloses a passive auto-focus method, carried out by the passive auto-focus device of the present disclosure or its equivalent, operable to adaptively set the focus-searching range and/or the focus-searching step during a focusing procedure. An embodiment of the passive auto-focus method includes the following steps: comparing a range of a variation area of a current scene with a predetermined range to determine a focus-searching range, in which the variation area of the current scene is defined according to the comparison between the current scene and a preceding scene, and the focus-searching range indicates one of several different ranges; generating a current step setting value according to the focus-searching range or by comparing the definition pertaining to the focus-searching range with a first predetermined definition in which the current step setting value indicate one of several different steps; and generating a plurality of image records in connection with the focus-searching range and the current step setting value by order.

Another embodiment of the above-mentioned passive auto-focus method includes the following steps: comparing a range of a variation area of a current scene with a predetermined range to determine a focus-searching range in which the variation area of the current scene is defined according to the comparison between the current scene and a preceding scene while the focus-searching range indicates a narrow focus-searching range if the range of the variation area is within the predetermined range or else the focus-searching range indicates a wide focus-searching range; and generating a plurality of image records in connection with the focus-searching range, wherein the narrow focus-searching range falls within the range of the variation area while at least some of the wide focus-searching range falls out of the range of the variation area.

These and other objectives of the present disclosure no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this technical field. If any term is defined in this specification, such term should be explained accordingly. In addition, the connection between objects or events in the disclosed embodiments can be direct or indirect provided that these embodiments are still practicable under such connection. Said "indirect" means that an intermediate object or a physical space is existed between the objects, or an intermediate event or a time interval is existed between the events.

The present disclosure discloses a passive auto-focus device and method capable of adaptively adjusting a focus-searching range (e.g. the variation range of focal distance) and/or altering a focus-searching step (e.g. the unit amount of focal distance variation) during a focusing procedure, and thereby finding out the focus efficiently and appropriately. This disclosure is applicable to an integrated circuit (e.g. an image processing IC) or a system device (e.g. a stationary or portable image processing device). Provided that an alternative means is available and reasonable, people of ordinary skill in the art can use such means similar or equivalent to that described in this specification to carry out the present disclosure, which implies that the scope of this disclosure is not limited to the embodiments in this specification. On account of that some element of the present passive auto-focus device could be known, the detail of such element is omitted provided that this omission nowhere dissatisfies the specification and enablement requirements. In addition, the present passive auto-focus method can be in the form of firmware and/or software which could be carried out by the device of this disclosure or the equivalent thereof; therefore, provided that the remaining disclosure is enough for understanding and enablement, the following description abridges the hardware details for carrying out the method but puts the emphasis on the steps. Please note that each embodiment in the following description includes one or more features; however, this does not mean that one carrying out the present disclosure should make use of all the features of one embodiment at the same time, or should only carry out different embodiments separately. In other words, if an implementation derived from one or more of the embodiments is practicable, a person of ordinary skill in the art can selectively make use of some or all of the features in one embodiment or selectively make use of the combination of some or all features in several embodiments to have the implementation realized, so as to increase the flexibility of carrying out the present disclosure.

Figure 1:
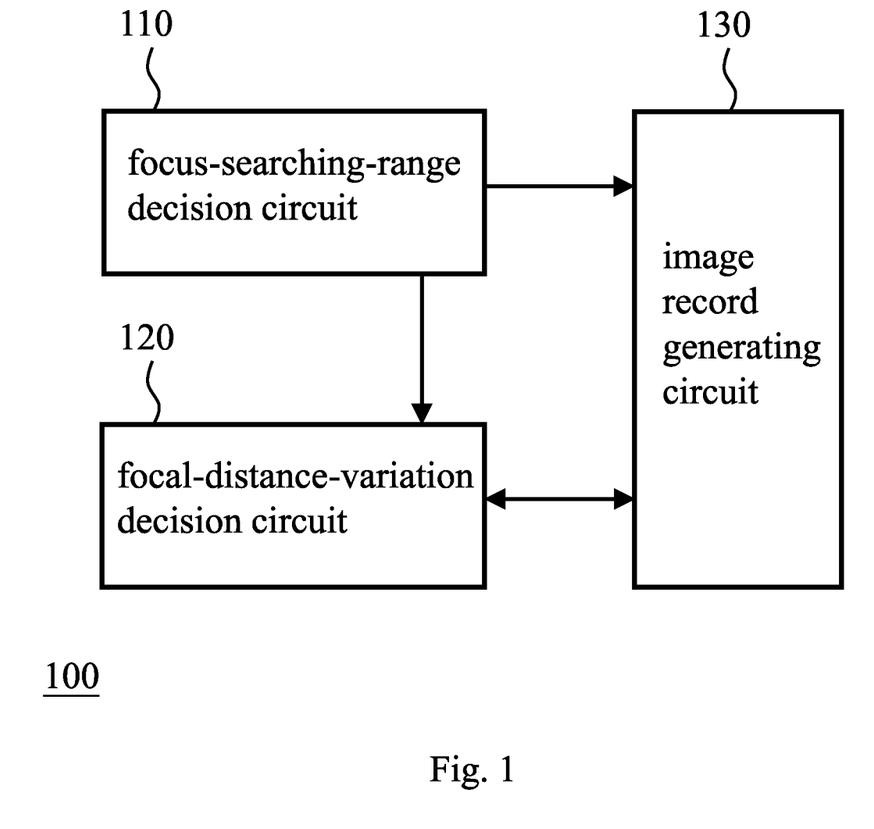
FIG. 1 illustrates an embodiment of the passive auto-focus device of the present disclosure.
Figure 2:
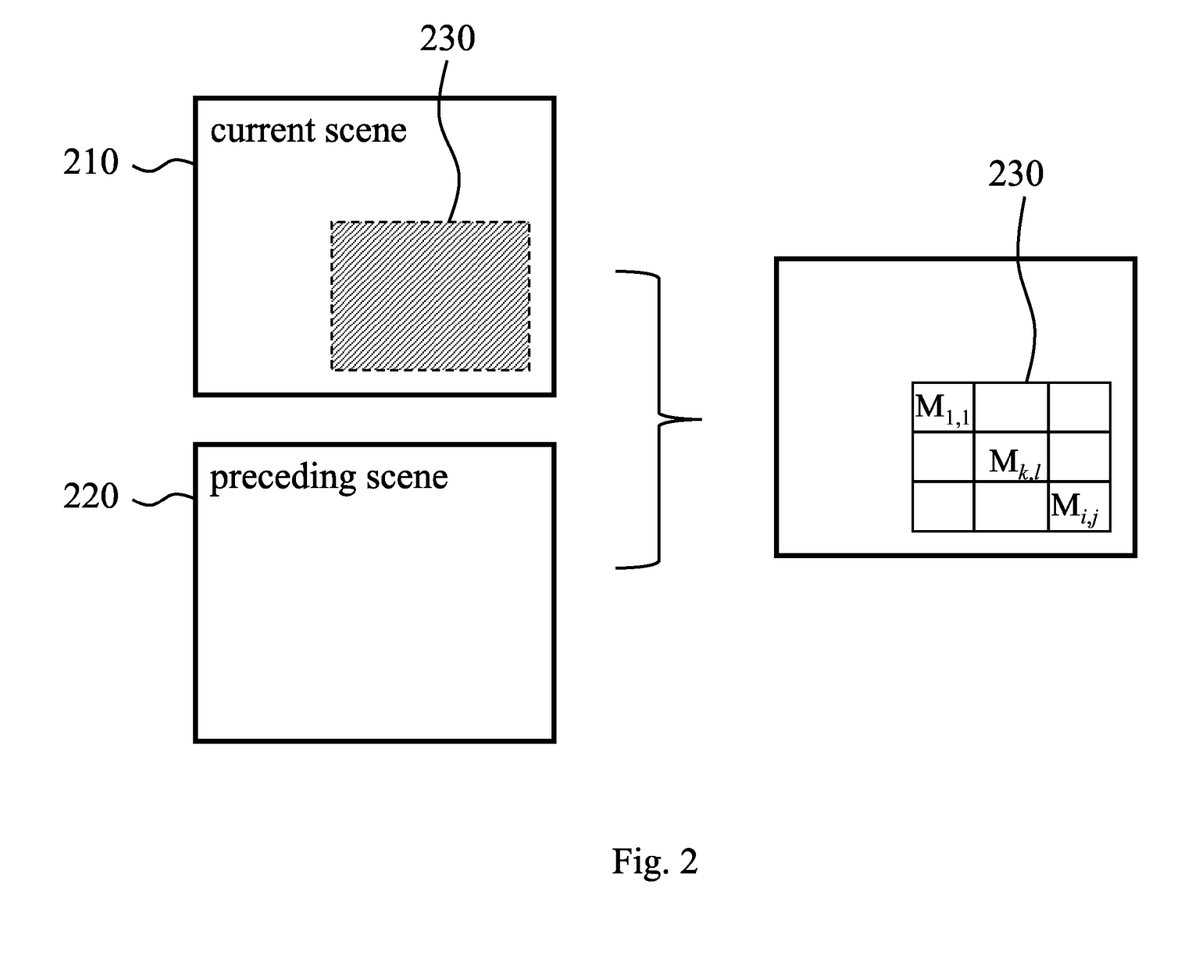
FIG. 2 illustrates the variation area of a current scene in comparison with a preceding scene of the present disclosure.

FIG. 1 illustrates an embodiment of the passive auto-focus device of the present disclosure. This passive auto-focus device 100 comprises a focus-searching-range decision circuit 110, a focal-distance-variation decision circuit 120 and an image record generating circuit 130. The said circuits 110, 120, 130 could be integrated into one or several circuits. As it is shown in FIG. 1 and FIG. 2, the focus-searching-range decision circuit 110 is operable to compare the range of a variation area 230 of a current scene 210 with a predetermined range and thereby generate a focus-searching range, in which the variation area 230 of the current scene 210 is defined according to the comparison between the current scene 210 and a preceding scene 220, and the current scene 210, and, in some embodiments, the preceding scene 220 and the current scene 210 and are two consecutive captured images; the said predetermined range could be a range defined by one or several thresholds, and the said focus-searching range could be one of several predetermined different ranges such as a range centered on a to-be-captured image or at least some of the range of the variation area 230. For instance, the predetermined range is defined by a high threshold and a low threshold; if the range of the variation area 230 falls within the predetermined range (i.e. between the high and low thresholds), the range of the variation area 230 is regarded as an appropriate one and thus the focus-searching-range decision circuit 110 makes the focus-searching range a first focus-searching range; if the range of the variation area 230 is broader than the predetermined range (i.e. more than the high threshold), the current scene is very like to be totally different from or insignificantly related to the preceding scene, and therefore the focus-searching-range decision circuit 110 makes the focus-searching range a second focus-searching range to carry out a more comprehensive search for the obviously changed current scene; and if the range of the variation area 230 is obviously narrower than the predetermined range (i.e. less than the low threshold), the variation ratio (a.k.a. the foreground ratio) of the current scene could be limited, which means that the depths of field for objects in the current scene are similar, and therefore the focus-searching-range decision circuit 110 makes the focus-searching range a relatively broad third focus-searching range to prevent missing the optimal focus for the current scene. In the above-described instance, the first focus-searching range is different from or smaller than each of the second and third focus-searching ranges, and falls within the range of the variation area 230; at least some of the second focus-searching range falls outside the range of the variation area 230 while the second focus-searching range could be set at the center of a to-be-captured image; and the third focus-searching range could be equal to or different from the second focus-searching range based the demands of those who put the present disclosure into practice.

Referring to both FIG. 1 and FIG. 2, under some circumstance (e.g. a circumstance that the variation area 230 is concerned with the same foreground object), the variation area 230 is restricted to the same focus plane; meanwhile, the focus information of a partial variation area 230 is enough to reflect the focus information of the total variation area 230. Therefore, if the focus-searching-range decision circuit 110 set the focus-searching range as the aforementioned first focus-searching range in view of that the range of the variation area 230 is acceptable, the first focus-searching range could be the range of a single information block of the variation area 230. More specifically, the variation area 230 in this case includes a plurality of information blocks (i.e. the blocks $M_{1,1}$ through $M_{i,j}$ in which the suffixes i, j are positive integers) and the focus-searching-range decision circuit 110 takes the range of a sampling portion of the plurality of information blocks (e.g. the information block $M_{k,l}$ in which the suffixes k, l are positive integers while $1 \leq k \leq i$ and $1 \leq l \leq j$) as the focus-searching range for the following focusing procedure. In the above example, in consideration of that an information block close to the edge of the variation area 230 is likely to include scenes of different depths of fields which might lead to an unwanted focus, the sampling portion is better to be one or more information blocks around or most close to the center of the variation area 230, and/or not adjoining to the edge of the variation area 230. In addition, the amount and scope of the said information block(s) and the use/discard of the incomplete information block(s) adjacent to the edge of the variation area 230 could be determined based on the demands of those carrying out the present disclosure.

Figure 3:
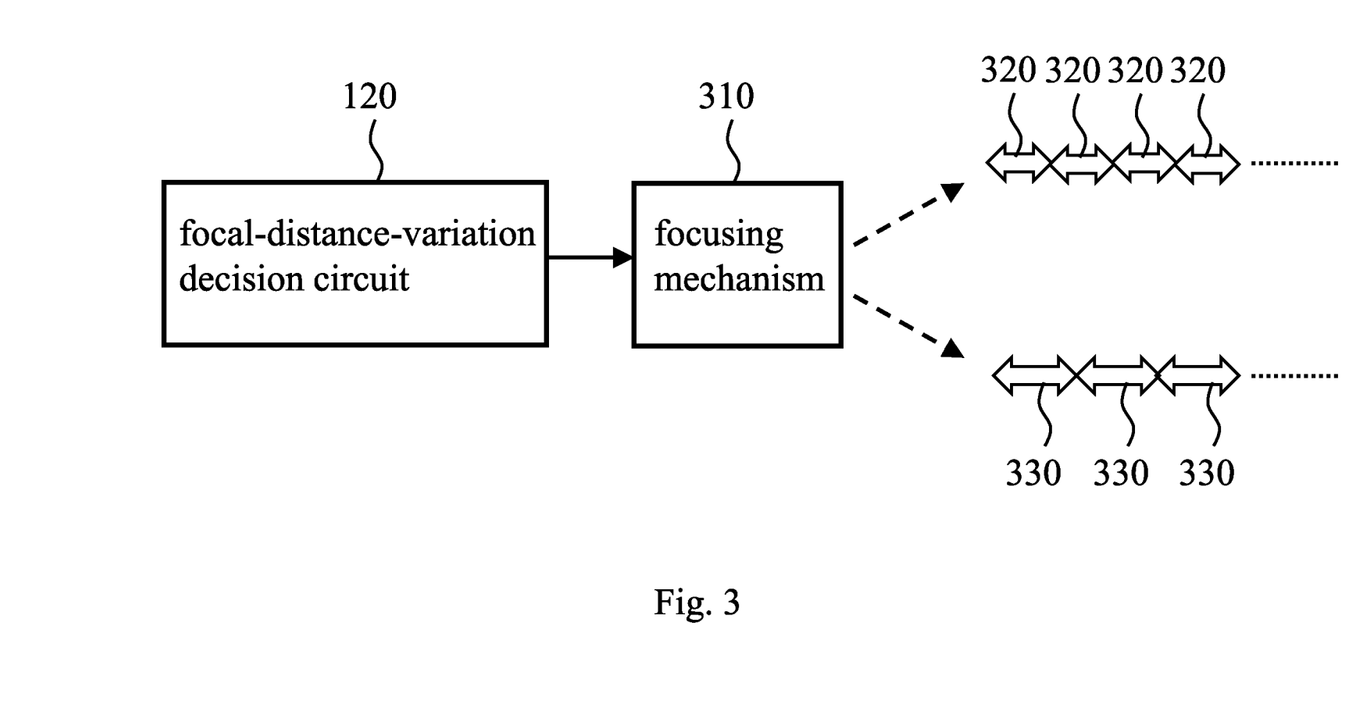
FIG. 3 illustrates how a focal-distance-variation decision circuit of FIG. 1 controls a focusing mechanism.

After the focus-searching range is set, the focal-distance-variation decision circuit 120 is allowed to set the breadth of the focus-searching step of a focusing mechanism (e.g. a step motor, a voice coil motor, or etc.) in accordance with the setting of the focus-searching range or the definition (which could be or be derived from the sharpness measure and/or clarity measure here) in connection with the focus range. In general, a wider focus-searching step is suitable for an uncomplicated scene while a narrower focus-searching step is applicable to a complicated scene. More specifically, referring to FIG. 1 and FIG. 3, the focal-distance-variation decision circuit 120 is operable to generate a current step setting value according to the choice of the focus-searching range (e.g. the aforementioned first focus-searching range), or generate the current step setting value by comparing the definition in connection with the focus-searching range with a first predetermined definition, in which the definition pertaining to the focus-searching range could be derived through any known definition calculation algorithm or the like such as an image difference analysis method, an image gradient analysis method or a modulation transfer method (MTF). Furthermore, the current step setting value indicates one of several predetermined different steps to make a focusing mechanism 310 determine the scale of its step during the focusing process. For instance, if the focus-searching range is the said first focus-searching range, that is to say, if the focus-searching range falls within the range of the variation area 230, the focal-distance-variation decision circuit 120 generates the current step setting value to define a narrower first step 320, and the focusing mechanism 310 then searches for the focus by varying the focal distance according to the narrower first step 320. In addition, if the focus-searching range is the aforementioned second or third focus-searching range, that is to say, if at least some portion of the focus-searching range falls outside the range of the variation area 230, the focal-distance-variation decision circuit 120 generates the current step setting value by comparing the definition associated with the focus-searching range with the first predetermined definition; in the case of the definition associated with the focus-searching range higher than the first predetermined definition, the current step setting value indicates the first step 320; in the case of the definition associated with the focus-searching range lower than the first predetermined definition, the current step setting value indicates a wider second step 330, and then the focusing mechanism 310 searches for the focus by altering the focal distance according to the wider second step 330.

Figure 4:
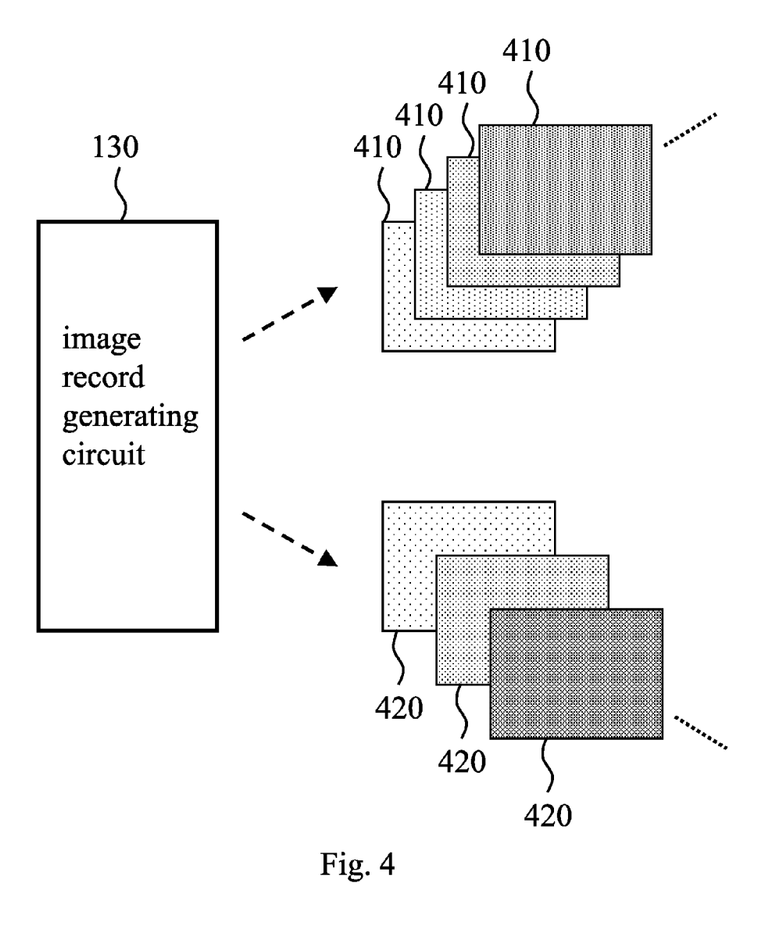
FIG. 4 illustrates how the image record generating circuit of FIG. 1 generates first or second step image records.

After obtaining the focus-searching range and step, the image record generating circuit 130 is allowed to acquire raw image data through the operation of the focusing mechanism, lens, photoelectric recording medium and other necessary means, and thereby generate a plurality of image records for the consequent analysis or process. More specifically, as it is shown in FIG. 1 and FIG. 4, the image record generating circuit 130 is coupled with the focus-searching-range decision circuit 110 and the focal-distance-variation decision circuit 120 directly or indirectly, operable to generate a plurality of first image records 410 according to the focus-searching range when the aforementioned current step setting value sets a first step, and operable to generate a plurality of second image records 420 according to the focus-searching range when the current step setting value sets a second step, in which the first step is shorter than the second step, and the image records include the information of brightness, color and/or the like or include the source or derived information thereof (e.g. the definition, sharpness measure, etc.). Of course the image record generating circuit 130 is operable to provide the definition pertaining to the focus-searching range during the procedure of the focal-distance-variation decision circuit 120 generating the current step setting value, or provide image information appropriate for other circuits.

Figure 5:
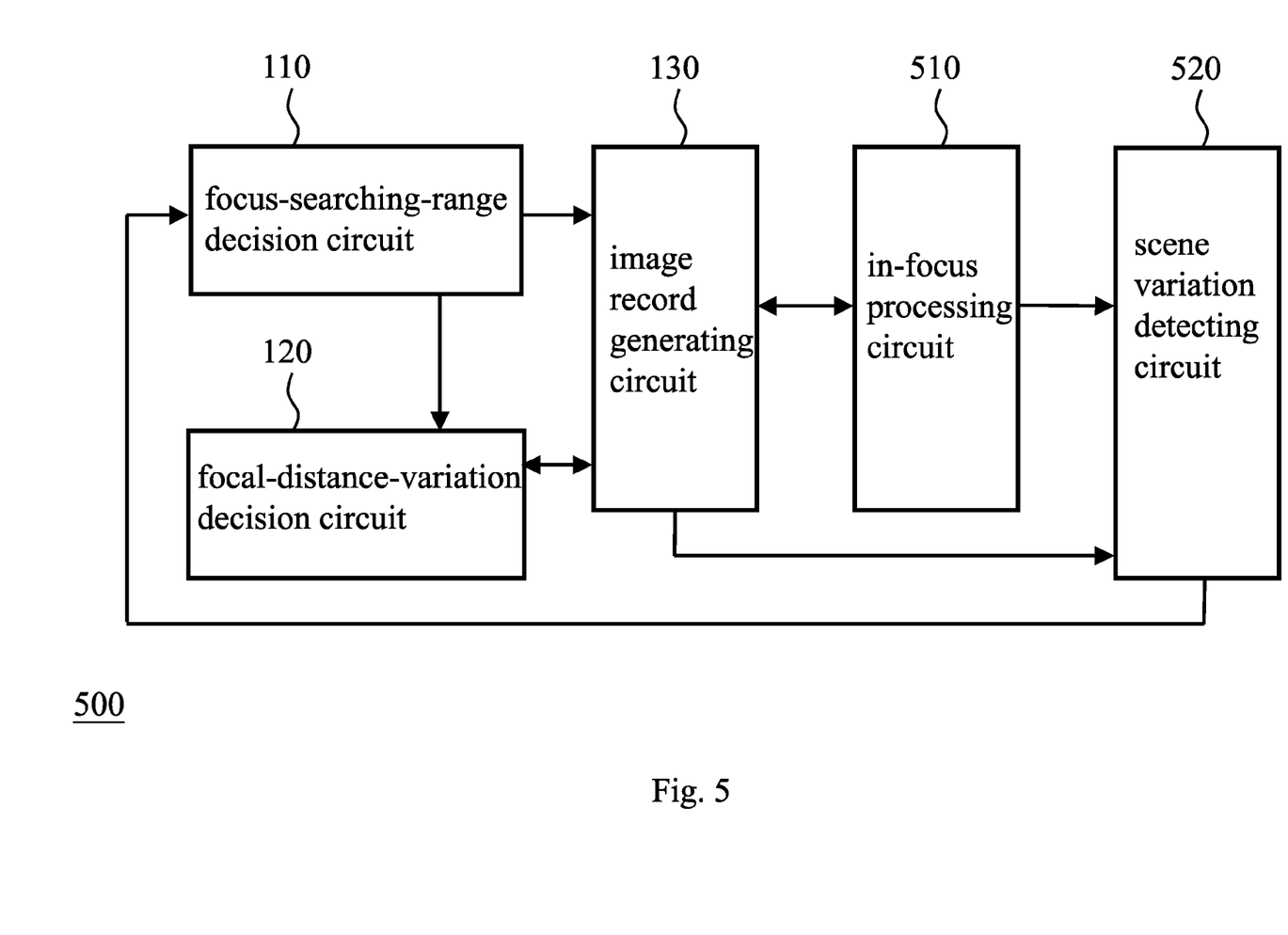
FIG. 5 illustrates another embodiment of the passive auto-focus device of the present disclosure.

As the aforementioned first or second step image records were generated, these image records are inspected one by one to determine whether a state of in-focus is accomplished while the number of the first or second step image records varies with the in-focus process. The means for the determination of in-focus could be any of known or self-designed focus-searching manners. In addition, after finishing searching for the focus, if the scene under observation is changed from the current scene to a next scene, the processes for the determination of the focus-searching range, the determination of the focus-searching step and the generation of the image records is executed again for the said next scene. For instance, as it is shown in FIG. 5, compared with the circuit of FIG. 1, the passive auto-focus device 500 of the present disclosure further comprises an in-focus processing circuit 510 and a scene variation detecting circuit 520. The in-focus processing circuit 510 is coupled with the image record generating circuit 130 and operable to carry out an in-focus process according to the plurality of first or second image records and thereby keep an in-focus image record of the current scene. The scene variation detecting circuit 520 is operable to compare the said in-focus image record with a real-time stable image record (e.g. comparing the color and/or definition of the in-focus image record with the other one) and then determine the next scene. To be more specific, the scene variation detecting circuit 520 is operable to compare the in-focus image record with a real-time image record first to find out whether the scene under observation is changed, and then compare one real-time image record with the successive record thereof to ascertain whether the scene under observation is stable. If the scene is found stable, the real-time image record is the mentioned real-time stable image record which is the image record of the next scene as well; in the meantime, the scene variation detecting circuit 520 is allowed to compare the in-focus image record with the real-time stable image record so as to determine the range of a variation area of the next scene in comparison with the current scene. Similarly, the range of the variation area 230 of the current scene 210 in comparison with the preceding scene 220 in the embodiments of FIG. 1 and FIG. 2 could be determined in the same or an equivalent manner.

Figure 6:
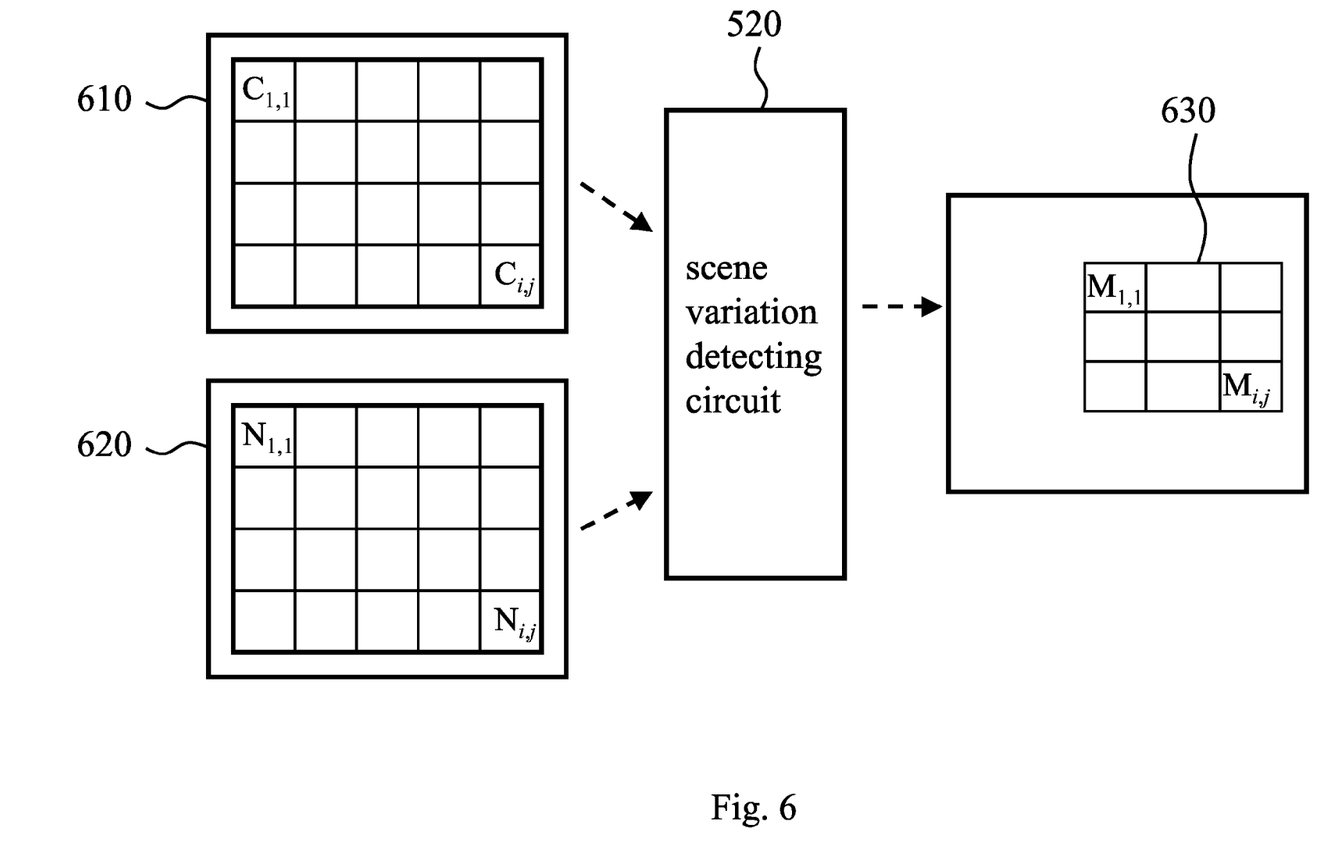
FIG. 6 illustrates how the scene variation detecting circuit of FIG. 5 detects a variation area of a current scene in comparison with a preceding scene.

On the basis of those mentioned above and with the reference made to FIG. 6 in order to determine the variation area of the next scene 620 in comparison with the current scene 610, each of the current scene 610 and the next scene 620 may be divided into the same number of information block(s) in which the current scene 610 includes the information block(s) $C_{1,1}$ through $C_{i,j}$ (where i, j are positive integers) while the next scene 620 includes the information block(s) $N_{1,1}$ through $N_{i,j}$. Therefore, the scene variation detecting circuit 520 is able to determine the variation of each information block by comparing the image record (e.g. color and/or definition record) of one information block with its corresponding one (that is to say, the information block $C_{l,k}$ of the current scene is compared with the information block $N_{l,k}$ of the next scene, in which l, k are integers while 1<k<i and 1<l<j), and consequently determine the position and number of the changed information block(s) $M_{1,1}$ through $M_{i,j}$, which tells about the variation area 630 of the next scene in comparison with the current scene. Similarly, the variation area 230 of the current scene 210 in comparison with the preceding scene 220 in the embodiments of FIG. 1 and FIG. 2 can be determined in the same or an equivalent way. Please note that the amount and scope of the said information block(s) and the use/discard of the incomplete information block(s) adjacent to the edge of the variation area could be determined based on the demands of those carrying out the present disclosure. Please also note that the variation area may include a plurality of variation area units; more specifically, the scene variation detecting circuit 520 is operable to find out several adjoining or separated variation area units by comparing the current scene with the next scene, and then define an area capable of including these variation area units as the variation area 630 such as the variation area 630 defined by the coordinate poles (e.g. $(x_{min}, y_{min})$, $(x_{max}, y_{max})$) of the variation area units.

In the embodiment of FIG. 1, in order to make the image record generating circuit 130 generate the image records in the direction of ascending definition, the image record generating circuit 130 is operable to generate a plurality of pilot image records in compliance with a focus-searching direction setting value in advance (in other words, the aforementioned focusing mechanism searches for the focus in a predetermined direction defined by the focus-searching direction setting value); in this case, the passive auto-focus device 100 further comprises a focus-searching-direction decision circuit (not shown) operable to maintain or change the focus-searching direction setting value and thereby determine the direction of focal-distance variation for generating a plurality of image records afterwards. For instance, if the plurality of pilot image records show that the image definitions related to the pilot image records get worse gradually, an erroneous focus-searching direction is ascertained and thus the focus-searching direction setting should be altered; but if the plurality of pilot image records show that the image definitions related to the pilot image records get better gradually, a correct focus-searching direction is ascertained and therefore the focus-searching direction setting should be held. Of course the focus-searching-direction decision circuit is also operable to provide the information indicating whether the focus-searching direction is right during the focus-searching process so as to maintain or change the searching direction.

In addition, in the embodiment of FIG. 1, if the focal-distance-variation decision circuit 120 adopts the second step (i.e. the wider focus-searching step), it may search for the focus back and forth around the peak of image definition (i.e. the focal point) and cause the real-time captured image unstable due to the wider searching step. In view of this problem, the focal-distance-variation decision circuit 120 of the present disclosure is operable to further generate a renewed step setting value according to the plurality of second step image records and a second predetermined definition; in this case, if the plurality of second step image records satisfy the second predetermined definition, the renewed step setting value indicates a narrower third step, and the image record generating circuit 130 generates a plurality of third step image records in connection with the renewed step setting value by order. Since the third step is narrower than the second step, the average focal-distance variation associated with the plurality of third step image records is less than the average focal-distance variation associated with the plurality of second step image records, which is helpful to lock onto the peak of image definition.

Please note that each of the focus-searching-range decision circuit 110 and the focal-distance-variation decision circuit 120 in the disclosed embodiments is allowed to be carried out independently, which means that each of them alone can cooperate with an appropriate known circuit. Furthermore, in the disclosed embodiments, the parameters (e.g. the focus-searching ranges, steps), settings and image records can be temporarily or permanently stored in an appropriate storage medium, if necessary; each of the mentioned circuits could be an independent circuit or included in one or several integrated circuits, and realized through the proper selection, configuration and cooperation of known logic circuits, comparing circuits, calculating circuits and etc. Moreover, when the auto-focus device of the present disclosure executes the focusing process for the first time, it may have the first work done in accordance with a predetermined focus area (e.g. a broader focus area of central weighted setting), a predetermined focus-searching step (e.g. a narrower step), a predetermined focus-searching direction, etc., and afterward the auto-focus device may carry out the following procedures including the decision on the scene variation, the decision on the focus-searching range, the decision on the focus-searching step and the generation of image records.

Figure 7:
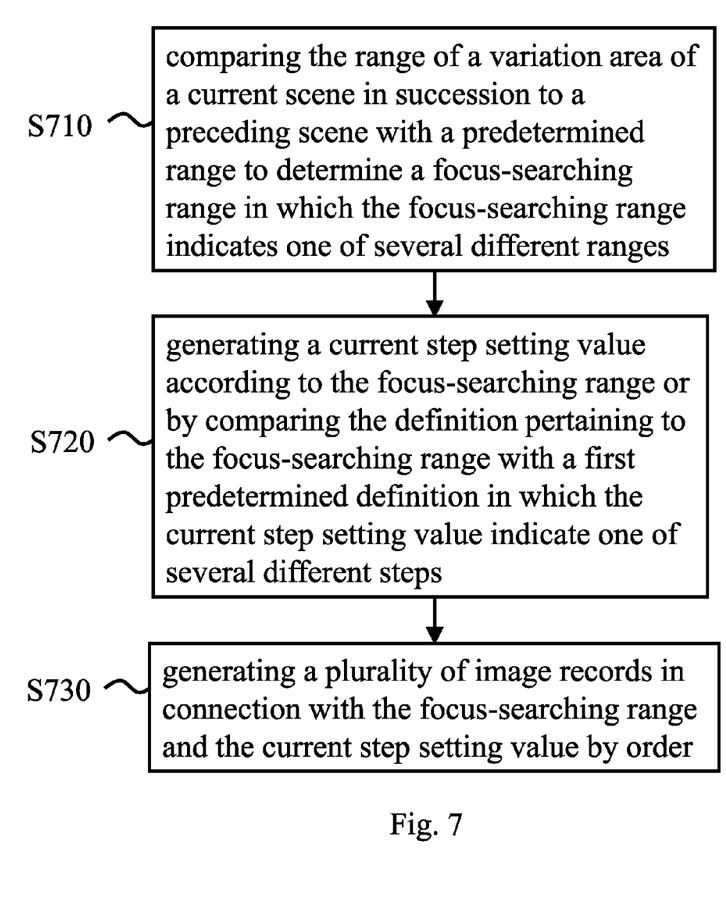
FIG. 7 illustrates an embodiment of the passive auto-focus method of the present disclosure.

In addition to the device of the above embodiments, the present disclosure also discloses a passive auto-focus method, carried out by the passive auto-focus device of the present disclosure or its equivalent, operable to adaptively set the focus-searching range and/or the focus-searching step during a focusing procedure. As it is shown in FIG. 7, an embodiment of the passive auto-focus method comprises the following steps:

Step S710: comparing the range of a variation area of a current scene with a predetermined range to determine a focus-searching range, in which the variation area of the current scene is defined according to the comparison between the current scene and a preceding scene, and the focus-searching range indicates one of several different ranges. This step could be carried out by the focus-searching range decision circuit 110 of FIG. 1 or the equivalent thereof.

Step S720: generating a current step setting value according to the focus-searching range or by comparing the definition pertaining to the focus-searching range with a first predetermined definition in which the current step setting value indicate one of several different steps. This step could be executed through the focal-distance-variation decision circuit 120 of FIG. 1 or its equivalent.

Step S730: generating a plurality of image records in connection with the focus-searching range and the current step setting value by order. This step could be carried out by the image record generating circuit 130 of FIG. 1 or its equivalent.

In addition to the above-mentioned steps, provided that an implementation is practicable, the present embodiment may employ any one or any combination of the following features:

(1) If the range of the variation area in step S710 falls within the predetermined range, the focus-searching range is set to be a first focus-searching range (e.g. a narrower focus-searching range) or else a second focus-searching range (e.g. a wider focus-searching range), in which the first focus-searching is within the range of the variation area while the second focus-searching range is outside the range of the variation area.

(2) The variation area includes a plurality of information blocks while the step S710 takes the range of a sampling portion of the plurality of information blocks as the focus-searching range.

(3) On the basis of (2), the center of the sampling portion is the center of the variation area or the sampling portion is at the position closest to the center of the variation area, and/or the sampling portion does not adjoin the edge of the variation area.

(4) If the step S720 determines that the definition in association with the focus-searching range is higher than the first predetermined definition, the current step setting value indicates a first step (e.g. a narrower step); if the step S720 determines that the definition in association with the focus-searching range is lower than the first predetermined definition, the current step setting value indicates a second step (e.g. a wider step).

(5) On the basis of (4), if the current step setting value indicates the second step, the plurality of image records of step S730 is a plurality of second step image records. In this case, the present embodiment further comprises: comparing the definition pertaining to the second step image records with a second predetermined definition; and if the definition pertaining to the second step image records satisfies the second predetermined definition, generating a plurality of third step image records by order in which the average focal-distance variation associated with the plurality of third step image records is less than the average focal-distance variation associated with the plurality of second step image records.

(6) The present embodiment may further comprises: executing an in-focus process according to the plurality of image records of step S730, then keeping an in-focus image record of the current scene, and determining a next scene by comparing the in-focus image record with a real-time stable image record.

(7) On the basis of (6), each of the said current scene and the preceding scene includes the same number of information blocks while the present embodiment further comprises: determining the range of the variation area of step S710 by comparing the image record(s) (e.g. the color and/or definition records) of the information block(s) of the current scene with the image record(s) of the information block(s) of the preceding scene.

(8) The present disclosure may further comprises: generating a plurality of pilot image records in compliance with a focus-searching direction setting value in advance by order; and maintaining or changing the focus-searching direction setting value to determine the direction of focal-distance variation in connection with the plurality of image records of step S730.

Figure 8:
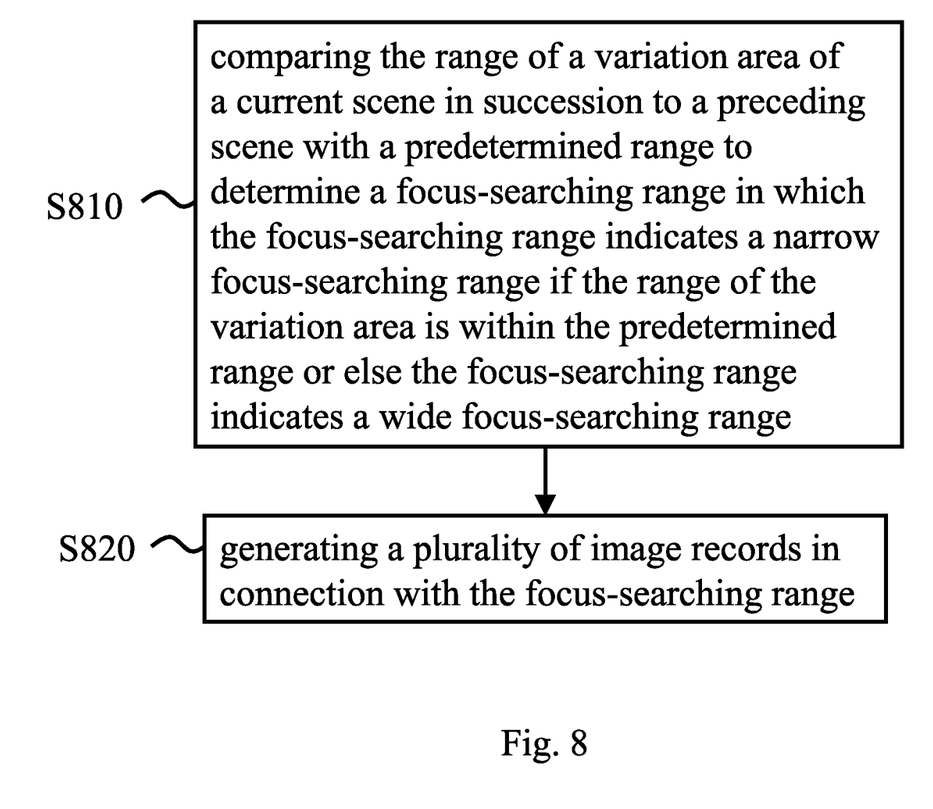
FIG. 8 illustrates another embodiment of the passive auto-focus method of the present disclosure.

Referring to FIG. 8, another embodiment of the method is presented, in which the method is capable of executing the step of determining the focus-searching range individually and comprises:

Step S810: comparing the range of a variation area of a current scene with a predetermined range to determine a focus-searching range, in which the variation area of the current scene is defined according to the comparison between the current scene and a preceding scene while the focus-searching range indicates a narrow focus-searching range if the range of the variation area is within the predetermined range or else the focus-searching range indicates a wide focus-searching range, wherein the narrow focus-searching range falls within the range of the variation area while at least some of the wide focus-searching range falls outside the range of the variation area. This step could be carried out by the focus-searching range decision circuit 110 of FIG. 1 or its equivalent.

Step S820: generating a plurality of image records in connection with the focus-searching range. This step could be carried out by the image record generating circuit 130 of FIG. 1 or the equivalent thereof.

The above embodiments may employ at least one of the aforementioned features (2), (3), (6), (7), (8). People of ordinary skill in the art can derive more implementation modifications of this embodiment from the foregoing description.

Since those of ordinary skill in the art can appreciate the implementation detail and modifications of the method by referring to the fore-illustrated device whose features can be reasonably adopted here, repeated and redundant description is therefore omitted while the remaining disclosure is still enough for understanding and enablement.

In summary, the passive auto-focus device and method are capable of determining the focus-searching range in accordance with the scope of the variation area of a scene so as to prevent the problem caused by an improper focus-searching range. Additionally, the present disclosure is also capable of adaptively determining the focus-searching step according to the definition in connection with a scene, and thereby improves the efficiency and result of a focusing process. Briefly, compared with the prior art, the present disclosure is cost-effective and has better performance.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A passive auto-focus device, comprising:
   a scene variation detecting circuit operable to determine a range of a variation area of a current scene by comparing image record(s) of information block(s) of the current scene with image record(s) of information block(s) of a preceding scene;
   a focus-searching-range decision circuit operable to compare the range of the variation area of the current scene with a predetermined range so as to determine a focus-searching range, in which the variation area of the current scene is defined according to the comparison between the current scene and the preceding scene;
   a focal-distance-variation decision circuit operable to generate a current step setting value according to the focus-searching range or by comparing the definition pertaining to the focus-searching range with a first predetermined definition; and
   an image record generating circuit operable to generate a plurality of first step image records in connection with the focus-searching range when the current step setting value indicates a first step, and generate a plurality of second step image records in connection with the focus-searching range when the current step setting value indicates a second step, in which the first step is shorter than the second step.

2. The passive auto-focus device of claim 1, wherein when the range of the variation area falls within the predetermined range, the focus-searching range is a first focus-searching range; and when the range of the variation area falls without the predetermined range, the focus-searching range is a second focus-searching range, in which the first focus-searching range is smaller than the second focus-searching range and falls within the range of the variation area.

3. The passive auto-focus device of claim 1, wherein the variation area includes a plurality of information blocks while the focus-searching-range decision circuit is operable to take a sampling portion of the plurality of information blocks as the focus-searching range.

4. The passive auto-focus device of claim 3, wherein the center of the sampling portion is the center of the variation area, the sampling portion is at the position closest to the center of the variation area, or the sampling portion is not adjacent to the edge of the variation area.

5. The passive auto-focus device of claim 1, wherein if the focus-searching range is within the range of the variation area or the definition pertaining to the focus-searching range is higher than the first predetermined definition, the current step setting value indicates the first step; and if at least some of the focus-searching range is outside the range of the variation area and the definition pertaining to the focus-searching range is lower than the first predetermined definition, the current step setting value indicates the second step.

6. The passive auto-focus device of claim 1, further comprising:
an in-focus processing circuit operable to carry out an in-focus process according to the plurality of first step image records or the plurality of second step image records, and thereby keep an in-focus image record of the current scene,
wherein the scene variation detecting circuit is operable to determine a next scene by comparing the in-focus image record with a real-time stable image record.

7. The passive auto-focus device of claim 6, wherein each of the current scene and the preceding scene includes the same number of information block(s).

8. The passive auto-focus device of claim 1, wherein the image record generating circuit is operable to generate a plurality of pilot image records in compliance with a focus-searching direction setting value in advance, and the passive auto-focus device further comprises:
a focus-searching-direction decision circuit operable to maintain or change the focus-searching direction setting value and thereby determine the direction of focal-distance variation in connection with the plurality of first or second step image records.

9. The passive auto-focus device of claim 1, wherein the focal-distance-variation decision circuit is operable to further generate a renewed step setting value according to the plurality of second step image records and a second predetermined definition; when the plurality of second step image records satisfies the second predetermined definition, the image record generating circuit generates a plurality of third step image records in connection with the renewed step setting value by order; and the average focal-distance variation associated with the plurality of third step image records is less than the average focal-distance variation associated with the plurality of second step image records.

10. A passive auto-focus method operable to be carried out by a passive auto-focus device, comprising the following steps:
determining a range of a variation area of a current scene by comparing image record(s) of information block(s) of the current scene with image record(s) of information block(s) of a preceding scene;
comparing the range of the variation area of the current scene with a predetermined range to determine a focus-searching range, in which the variation area of the current scene is defined according to the comparison between the current scene and the preceding scene, and the focus-searching range indicates one of several different ranges;
generating a current step setting value according to the focus-searching range or by comparing the definition pertaining to the focus-searching range with a first predetermined definition in which the current step setting value indicate one of several different steps; and
generating a plurality of image records in connection with the focus-searching range and the current step setting value by order.

11. The passive auto-focus method of claim 10, wherein if the range of the variation area falls within the predetermined range, the focus-searching range is a first focus-searching range or else the focus-searching range is a second focus-searching range in which the first focus-searching range falls within the range of the variation area while at least some of the second focus-searching range falls outside the range of the variation area.

12. The passive auto-focus method of claim 10, wherein the variation area includes a plurality of information blocks while the step of determining the focus-searching range includes a step of taking a sampling portion of the plurality of information blocks as the focus-searching range in which the center of the sampling portion is the center of the variation area, the sampling portion is at the position closest to the center of the variation area, or the sampling portion is not adjacent to the edge of the variation area.

13. The passive auto-focus method of claim 10, wherein if the focus-searching range is within the range of the variation area or the definition pertaining to the focus-searching range is higher than the first predetermined definition, the current step setting value indicates a first step; and if at least some of the focus-searching range is outside the range of the variation area and the definition pertaining to the focus-searching range is lower than the first predetermined definition, the current step setting value indicates a second step.

14. The passive auto-focus method of claim 13, wherein if the current step setting value indicates the second step, the plurality of image records is a plurality of second step image records; and the passive auto-focus method further comprises:
comparing the definition pertaining to the second step image records with a second predetermined definition; and
if the definition pertaining to the second step image records satisfies the second predetermined definition, generating a plurality of third step image records by order, in which the average focal-distance variation associated with the plurality of third step image records is less than the average focal-distance variation associated with the plurality of second step image records.

15. The passive auto-focus method of claim 10, further comprising:
executing an in-focus process according to the plurality of image records and then keeping an in-focus image record of the current scene; and
determining a next scene by comparing the in-focus image record with a real-time stable image record.

16. The passive auto-focus method of claim 10, wherein each of the current scene and the preceding scene includes the same number of information block(s).

17. The passive auto-focus method of claim 10, further comprising:
   generating a plurality of pilot image records in compliance with a focus-searching direction setting value in advance; and
   maintaining or changing the focus-searching direction setting value to determine the direction of focal-distance variation in connection with the plurality of image records.

18. A passive auto-focus method, comprising the following steps:
   determining a range of a variation area of a current scene by comparing image record(s) of information block(s) of the current scene with image record(s) of information block(s) of a preceding scene;
   comparing the range of the variation area of the current scene with a predetermined range to determine a focus-searching range in which the variation area of the current scene is defined according to the comparison between the current scene and the preceding scene while the focus-searching range indicates a narrow focus-searching range if the range of the variation area is within the predetermined range or else the focus-searching range indicates a wide focus-searching range; and
   generating a plurality of image records in connection with the focus-searching range,
   wherein the narrow focus-searching range falls within the range of the variation area while at least some of the wide focus-searching range falls outside the range of the variation area.

19. The passive auto-focus method of claim 18, wherein the variation area includes a plurality of information blocks while the step of determining the focus-searching range includes a step of taking a sampling portion of the plurality of information blocks as the focus-searching range in which the center of the sampling portion is the center of the variation area, the sampling portion is at the position closest to the center of the variation area, or the sampling portion is not adjacent to the edge of the variation area.

20. The passive auto-focus method of claim 19, wherein each of the current scene and the preceding scene includes the same number of information block(s).

* * * * *